June 3, 1924.
H. E. HARKIN
METHOD FOR SEPARATING EGG VALUES
Filed June 27, 1922    3 Sheets-Sheet 1
1,496,312
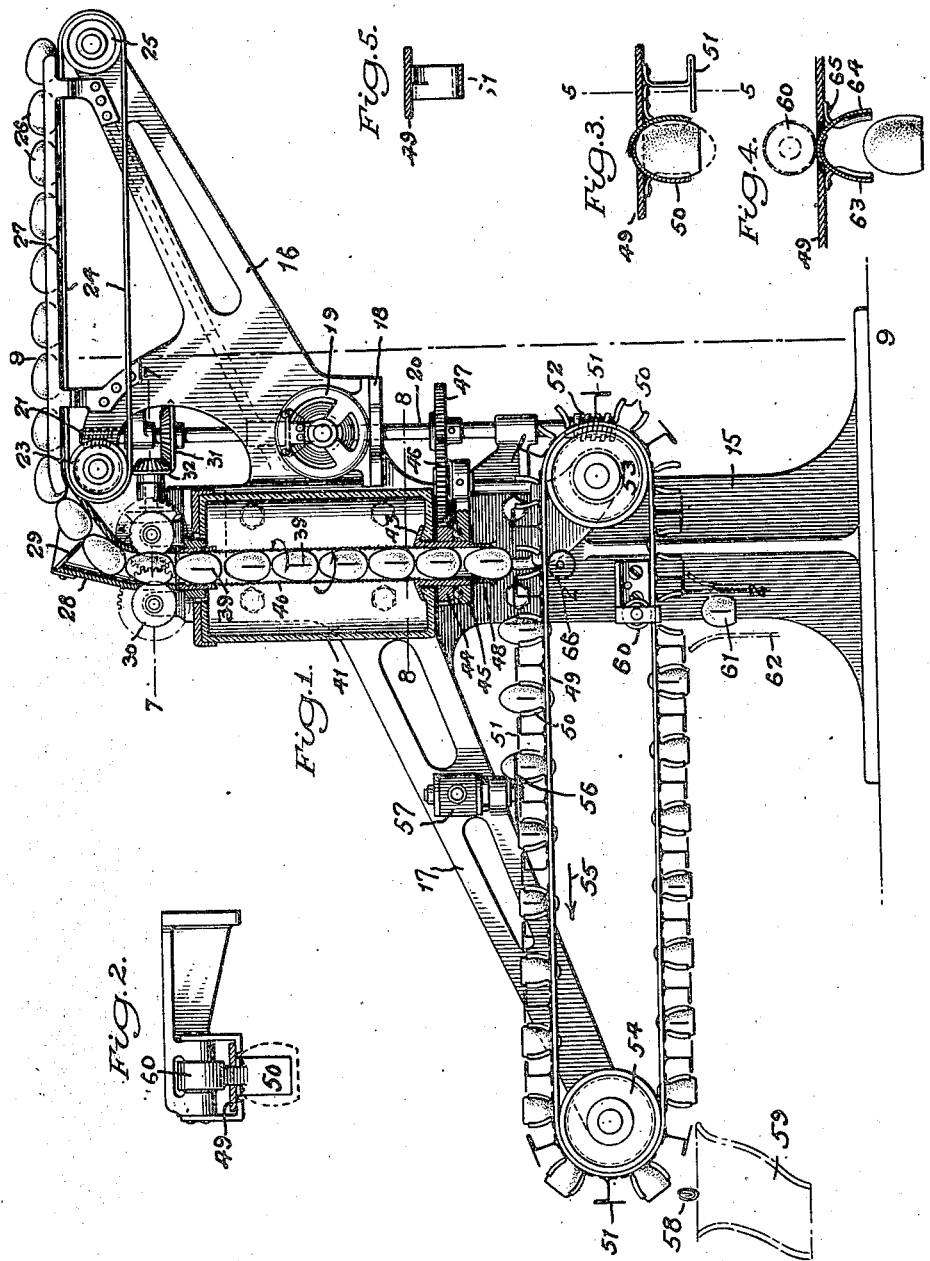
INVENTOR
HARRY E. HARKIN
BY
ATTORNEYS June 3, 1924.
H. E. HARKIN
1,496,312
METHOD FOR SEPARATING EGG VALUES
Filed June 27, 1922     3 Sheets-Sheet 2
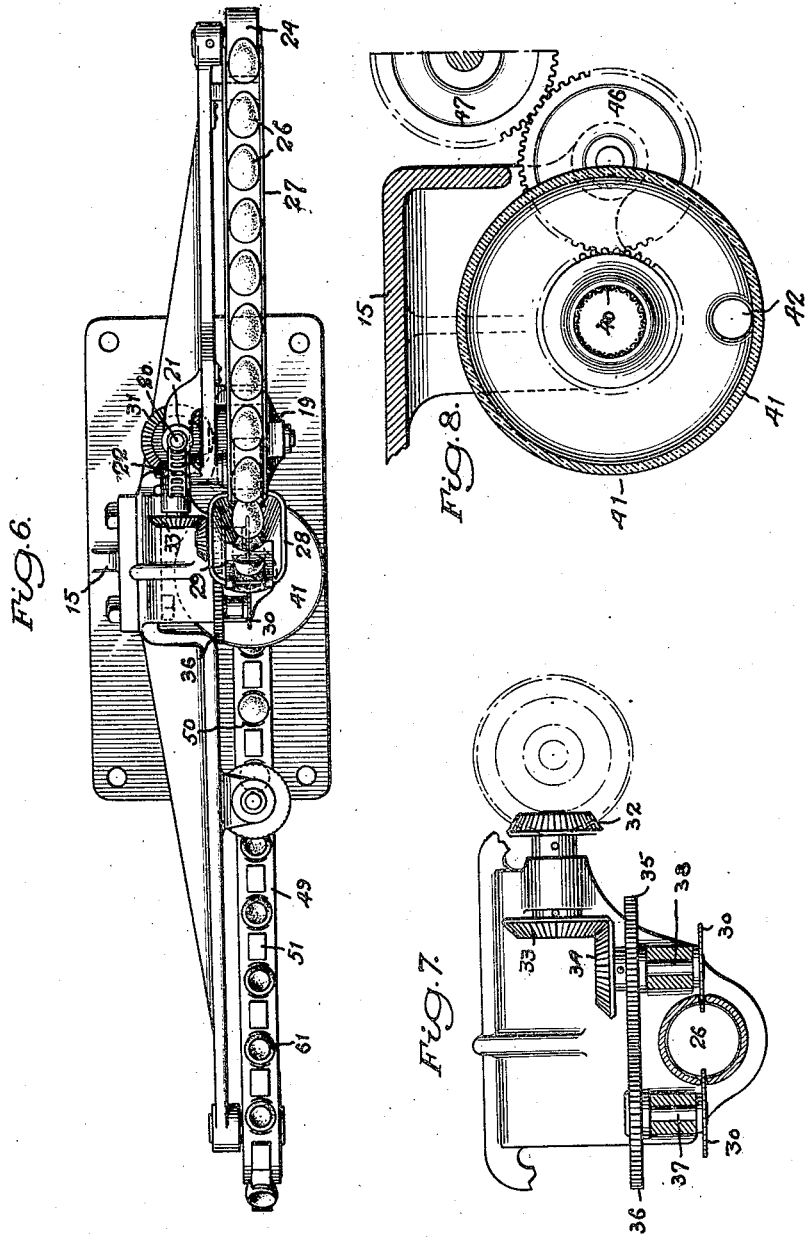
INVENTOR
HARRY E. HARKIN
BY
*Strowan and Strowan*
ATTORNEYS June 3, 1924.
H. E. HARKIN
METHOD FOR SEPARATING EGG VALUES
Filed June 27, 1922
1,496,312
3 Sheets-Sheet 3
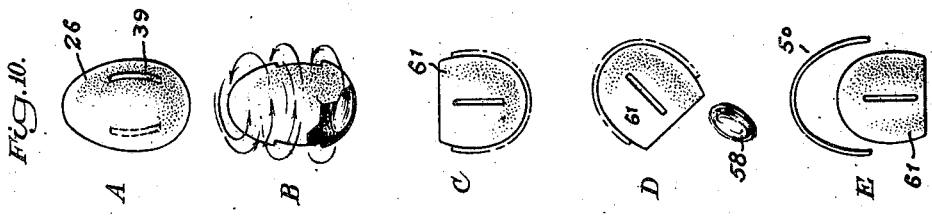
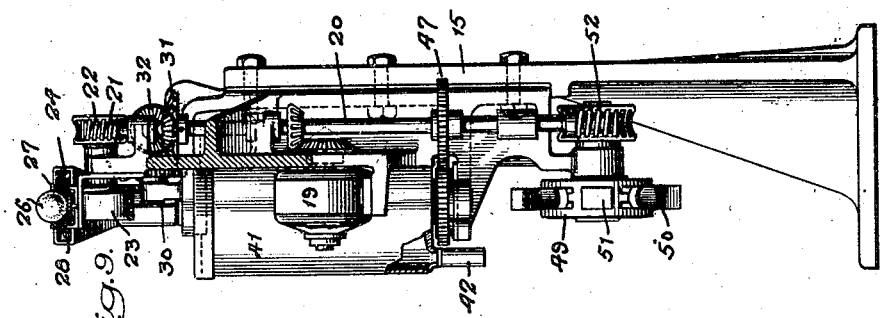
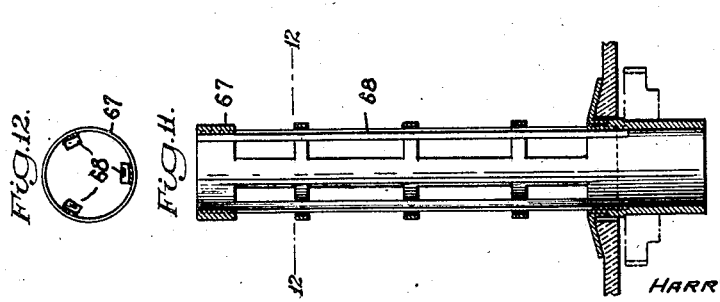
INVENTOR
HARRY E. HARKIN
BY
ATTORNEYS Patented June 3, 1924.

1,496,312

UNITED STATES PATENT OFFICE.

HARRY E. HARKIN, OF RIDGEFIELD PARK, NEW JERSEY, ASSIGNOR, BY DIRECT AND MESNE ASSIGNMENTS, TO EGG MACHINERY COMPANY, INC., OF NEW YORK, N. Y., A CORPORATION OF NEW JERSEY.

METHOD FOR SEPARATING EGG VALUES.

Application filed June 27, 1922. Serial No. 571,203.

*To all whom it may concern:*

Be it known that I, HARRY E. HARKIN, a citizen of the United States of America, residing at Ridgefield Park, in the county of Bergen and State of New Jersey, have invented certain new and useful Improvements in Methods for Separating Egg Values, of which the following is a specification.

My invention relates to an improved method for separating egg values. The object of my invention is to effect the separation of the contents of an egg from its shell, either with the whites and yolks mixed, or with the whites and yolks separated, as may be preferred. The invention contemplates an improved method and apparatus for automatically effecting the desired separation without the usual manual manipulation now commonly employed for this purpose.

Among the objects of my invention may be mentioned—1st, the provision of suitable means such as thin rotary saws for forming slots in the sides of the egg shell, and for decapitating the end of the shell to permit the contents to be discharged; 2nd, the forcible separation of the albumen from the yolk of the egg, to assure a more complete separation of these elements of the egg than has been heretofore accomplished either by machine or by hand; 3rd, the forcible separation of the albumen from the yolk while the latter is still retained in the shell; 4th, the separation of the albumen from the yolk by centrifugal force; 5th, the formation of restricted apertures in the side walls of the egg through which the albumen may be extracted by centrifugal force, while the shell remains otherwise intact; 6th, the decapitating of the egg shell and the automatic inversion of the decapitated shell to deliver its contents to a suitable receptacle, followed by the automatic discharge of the shell at a separate point; 7th, various other features of improvement and novelty, which are hereinafter described or illustrated, more or less diagrammatically, in the accompanying drawings, in which—

Fig. 1 is a vertical section through a machine in which my method may be performed;

Fig. 2 is a section on the line 2—2, Fig. 1;

Fig. 3 is an enlarged view of a clip for holding the eggs in transit through the apparatus;

Fig. 4 is a similar view showing the clip in open position to discharge the shell;

Fig. 5 is a section on the line 5—5, Fig. 3;

Fig. 6 is a plan view of the apparatus shown in Fig. 1;

Figs. 7 and 8 are respectively sections on the lines 7—7 and 8—8, Fig. 1, but drawn to a larger scale;

Fig. 9 is an end elevation of the machine;

Fig. 10 is a more or less diagrammatic representation of an egg at various stages of its treatment as it passes through a machine of the type shown, and indicating the separate discharge of the albumen and the yolk from the shell in accordance with the present invention; and Figs. 11 and 12 are respectively vertical and horizontal sections through a modified form of centrifugal.

In spite of the fact that a tempting market is afforded by commercial bakeries, manufacturers of salad dressings, etc., for egg contents, either separated, or with the yolks and albumen combined, no machine has heretofore been devised, so far as I am aware, in which the operation of separating these constituents of an egg has heretofore been successfully accomplished. I am aware that it has heretofore been proposed to break the egg shell and to drop the yolk and albumen upon an inclined screen to permit the albumen to pass through the screen, while the yolk slides down the latter to a separate receptacle, but in practice such method fails to accomplish the desired result, since the yolk is very apt to break as it travels down the screen, and thus pass through the latter with the whites into the receptacle intended for the latter alone. Moreover, even when the yolk succeeds in travelling the screen unbroken, it carries with it a fairly large proportion of the albumen, which is thus delivered to the receptacle intended for yolks alone. This is not desirable since the albuminous matter decomposes far more rapidly than the yolk constituent of the egg, causes polution of the latter, and renders it unmarketable. Moreover, in the manufacture of certain food preparations, such as salad dressings, the yolks are desired as free as possible from albumen, since the presence of the latter affects the marketability of the product.

It has also been proposed to simulate as closely as possible the hand-opening process machine, involving means and manipulations not feasible practically. Such suggestion involved complete severance of the shell into two separate parts, and aimed to let the contents out of the shell when in a position impractical for the purpose of separation of the contents or to otherwise advantageously discharge the contents, and it involved methods and means inapplicable for the handling of such a fragile article as an egg shell, and which with all could not effectually open eggs and discharge their contents as efficiently as by hand, for many obvious reasons.

It has therefore been the almost universal practice heretofore in commercial establishments to effect the opening of the eggs by hand, and the separation of the albumen from the yolk, when required, by suitable manipulation of the broken shell by the operative. Even with most skilled operatives, however, the separating operation requires time, and the maximum output of the best operatives is rarely over three hundred eggs in an hour and averages much lower.

According to the present invention, the separation of the albumen from the yolk of the egg is forcibly accomplished without separating the shell into parts, and so rapidly that thirty-five hundred to four thousand eggs per hour may be readily handled with perfect separation of albumen and yolk. The invention also contemplates the discharge of the egg contents commingled, if it is not desired to effect a separation of the albumen and yolk, and possesses certain features of marked improvement for this purpose over anything heretofore suggested in the art. It will be understood that the apparatus here shown is more or less diagrammatic, and may be varied in many ways, while still embodying the underlying thoughts of the invention. The method of operation is also susceptible of variation in certain particulars, and while I describe the best practice known to me at the present time, modifications will readily occur to those dealing with the problem with the knowledge of my invention.

Briefly, the method consists in forming apertures in the wall of the egg and rotating the latter at sufficient speed to forcibly expel the albumen through said apertures by centrifugal force, followed by a decapitation of the shell and the delivery of the yolk which is retained therein after the albumen has been discharged. Preferably the apertures through which the albumen is discharged are cut through the side of the egg shell and the latter is spun on its long axis during the centrifugal discharge of the albumen through the apertures. Preferably also the egg is maintained with its long axis in vertical position during rotation, in order to maintain the yolk in central position within the shell, that is on the axis of rotation, so that as the albumen leaves the shell the yolk will settle to the lower end and away from the apertures in the shell.

As shown in the accompanying drawings, a machine for practicing the present invention may comprise a standard 15, having transverse inclined arms 16 and 17 for supporting various portions of the machine. A platform 18 on the arm 16 carries an electric motor 19 which drives certain of the moving parts through a shaft 20.

Thus, at the upper end of the shaft is a worm 21 meshing with a worm wheel 22 which drives the pulley 23 for a conveyor belt 24 passing around the idler 25. The belt 24 forms a conveyor for the eggs 26 fed thereto from any suitable source, and held against escape by fixed lateral guides 27.

The belt 24 delivers to a chute 28 having a guard 29 to maintain the eggs in proper position as they pass therethrough.

Extending through slots into the lower portion of the chute 28 are thin rotary saw blades 30, of which there may be any suitable number, two being here indicated, driven at suitable speed from the shaft 20 through the bevel gears 31, 32, 33 and 34, and the gears 35 and 36 on the spindles 37 and 38 of the disk saws 30. As the eggs pass downward through the chute they come in contact with the disk saws 30 which open slits 39 in the side walls of the eggs. Owing to the fact that the long axis of the egg is substantially vertical as it passes the saws, the yolk is held in such position within the shell, and the projection of the saw blades into the passageway is so limited, that while the shell of the egg is slit the skin of the egg yolk is not ruptured.

The egg with its shell slit in this fashion is delivered from the lower end of the hopper to a centrifugal member 40, in which the eggs are whirled at sufficient speed to cause the albumen to discharge through the slits 39 in the shell under the influence of centrifugal force. As here shown the centrifugal member 40 is reticulated and the albumen discharged from the eggs is thrown out therethrough into a surrounding stationary receptacle 41 and discharges by gravity through the outlet port 42 in the bottom thereof. Preferably this chamber is made of glass, and is so mounted as to be readily removable for cleansing.

The centrifugal member 40 is here shown as a cylindrical wire mesh sleeve, which not only affords a reticulated wall for the discharge of the albumen, but is also of such construction that it engages the eggs with sufficient frictional effort to impart the necessary rotary motion thereto. Any suitable rotor for this purpose, however, may be substituted for the mesh screen. The screen is carried at its lower end by a cylindrical bushing 43, on which the gear 44 is fast. The ball bearing 45 supports the gear, which is driven at suitably high speed through gearing 46 from the driving gear 47 on the shaft 20.

Below the bushing 43 is a stationary guide chute 48 through which the eggs are delivered from the centrifugal member to a second conveyor 49. The latter carries at definitely spaced intervals along its length, suitable clips 50 adapted to receive the discharged egg from the chute 48. In order to insure the entry of the egg into the clip 50, suitable guards 51 are interposed between each pair of clips 50 and temporarily support the eggs during the advance of the conveyor 49. As a pair of clips comes in register with the guide chute 48, the lowermost egg drops by gravity or as aided by the movement of the superposed egg into the open clips and is held in upright position by the latter.

The conveyor 49 is driven by the worm 52 at the lower end of the shaft 20 through a worm wheel on the shaft of the pulley 53 around which the conveyor passes. The idler pulley 54 around which the conveyor passes is supported at the lower end of the arm 17 of the frame. As the eggs travel in the direction of the arrow 55 they come within the operating zone of a thin rotary saw 56 driven by a motor 57, and the upper or head ends of the eggs projecting above the clips are decapitated. As the conveyor rounds the pulley 54 the yolks 58, still retained in the shells, are discharged into a chute 59, down which they pass, to any suitable receptacle.

On the return travel of the conveyor 49, the latter passes a fixed roller 60 which bears against its inner face and serves to spread the clips and thus to release the empty egg shell 61, which is discharged through a chute 62.

The particular form of the clips on the conveyor 49 may be varied in many ways. I have shown, merely for example, a clip comprising a pair of plates 63 and 64, the bases of which overlap and normally project beyond the inner face of the conveyor belt 49 into such position that when they engage the roller 60 they are forced outward and thus spread open at their outer ends. The plates may be secured to the conveyor belt in any suitable way, as by means of spring lugs 65. I prefer to arrange a second clip-opening device 66 at the point at which the clips come beneath the guide chute 48, so that the eggs delivered from the centrifugal enter the clips without difficulty.

It will be understood of course that when it is not desired to separate the albumen from the yolk of the egg, the rotary slitting saws 30 may be removed from the spindles or shifted out of position to leave the passage through the centrifugal unobstructed, and the drive of the latter may also be stopped, so that the eggs pass down therethrough without rotation, and are delivered intact to the clips on the conveyor 49. They then pass to the decapitating device 56, which removes the upper end of the shell, and the combined albumen and yolk contents are discharged to the chute 57; or the rotor may be driven at such high speed as to completely discharge both albumen and yolk.

It will be noted that the decapitating saw 56 is arranged at some little distance from the discharge end of the conveyor 49. This leaves a sufficient length of travel after the egg is opened for an attendant "smeller" to detect and remove from the conveyor a defective egg before it is discharged to the chute 59.

The series of operations performed on the egg when the albumen and yolk are to be separately delivered from the shell is graphically represented in Fig. 10. The sides of the shell are first slotted while in vertical position—stage A. It is then (stage B) subjected to rotation at sufficient speed to remove the albumen by centrifugal force. It will of course be borne in mind that the yolk is central of the egg, more particularly so when held in vertical position, and is thus subjected to far less centrifugal stress than the albumen which surrounds the yolk and lies next to the shell. This centering of the yolk in the egg shell may be emphasized if desired by delivering the egg to the chute 28 with the point of the egg downward, so that the yolk tends to sink into the narrowed end of the shell which is centered during rotation, and is thus subjected to less centrifugal pull. This arrangement has the further advantage of keeping the yolk in a portion of the shell which is not slit by the saws 30, so that even if slightly distorted by the centrifugal action it will not rise to the slots and escape.

The centrifugal action effects the forcible removal of the albumen from the shell, and in a far more complete fashion than can be accomplished by gravity. As soon as the slots or apertures are cut, the white starts to ooze through, and thus quickly picks up rotation given to the shell, and the tenacious character of the albumen seems to cause the portion thereof which first discharges, to drag the remainder after it into the area of greatest centrifugal stress, with the result that it is all discharged—and the yolk remains practically clean in the shell. The shell thus forcibly emptied of the albumen, passes to the decapitating device (stage C), followed by inversion (stage D) for the discharge of the yolk by gravity, and finally the empty shell is released (stage E) at a point removed from the yolk chute.

If the albumen and yolk are to be discharged together, stages A and B are omitted, or the other stages are modified as before set forth.

It will of course be understood that the apertures in the sides of the egg shell need not be in the form of slots, but may be formed by puncturing the shell. I prefer the slots, however, since they may be formed by thin rotary saws which effectually clear the openings and leave them clean and unobstructed, the portions of the shell removed being carried away for the most part by the saw teeth.

As above stated, the centrifugal may be of any suitable type. Thus, in Fig. 11 I have indicated a slotted metallic cylinder 67 having longitudinally extending leaf springs 68 which frictionally grip the egg shell and spin it with the cylinder as the eggs pass downward therethrough.

Various other modifications in method and process will readily occur to those dealing with the problem, without departing from what I claim as my invention.

I claim—

1. A method of separating egg values from the shell, which comprises the step of positioning the egg with its major axis substantially vertical forming an aperture in the side of the shell, thereupon automatically applying force to the shell and removing at least a portion of the shell's contents through said aperture.

2. The method of separating egg values from the shell, which comprises the step of forming an aperture in the shell and expelling at least portion of the contents therethrough by centrifugal force.

3. The method of separating egg values from the shell, which comprises the step of forming an aperture in the shell and expelling the contained albuminous matter therethrough by centrifugal force.

4. The method of separating egg values from the shell, which comprises the step of forming an aperture in the side of the shell and expelling at least portion of the contents therethrough by centrifugal force.

5. The method of separating egg values from the shell, which comprises the step of forming an aperture in the side of the shell and spinning the egg approximately on its long axis to expel through said aperture at least portion of the shell contents.

6. The method of separating egg values from the shell, which comprises aperturing the shell, forcibly removing albuminous contents therethrough, decapitating one end of the shell, and inverting the latter to discharge the contained yolk.

7. The method of separating egg values from the shell, which comprises aperturing the shell, forcibly removing albuminous contents therethrough, decapitating one end of the shell, and inverting the latter to discharge the contained yolk, and then discarding the shell.

8. The method of separating egg values from the shell, which comprises the step of automatically positioning the egg and mechanically decapitating one end of the shell, thereafter automatically inverting the shell to discharge its contents.

9. The method of separating egg values from a plurality of shells, which comprises mechanically gripping each successive shell, automatically sawing off the end of each shell, automatically moving each egg for the discharge of the contents, in succession for the operation.

10. The method of separating egg values from a plurality of shells in succession, comprising the step of automatically passing each egg into predetermined position and aperturing the side of the shell at the equatorial region without breaking the shell into parts, thereafter automatically passing each egg into contact with a rotary saw to decapitate one end of the shell, and thereafter successively discharging the remaining contents of each shell.

11. The method of separating egg values from the shell, which comprises the step of passing the egg downward, with its long axis upright, into the path of a rotary saw to slot the side of the shell.

12. The method of separating egg values from the shell, which comprises the steps of bringing the egg laterally into the path of a substantially horizontal rotating saw to decapitate one end of the shell, discharging the latter, and discarding the shell at a point removed from the point of discharge.

13. The method of separating egg values from a plurality of shells, which comprises steps of automatically decapitating successively one end of each shell, and mechanically inverting the latter to discharge its contents while following eggs are being decapitated in succession.

14. The method of separating egg values from the shell, which comprises the steps of bringing the egg, with its long axis substantially upright, into the path of a rotating saw to decapitate the upper end of the shell, inverting the latter to discharge its contents, and discarding the shell at a point removed from the point of discharge.

15. The method of separating egg values from the shell, which consists in moving a series of eggs through the path of a rotating saw to decapitate the upper ends of the shells successively, passing the decapitated shells to inverted position to discharge their contents, and discarding the shells at a point removed from the point of discharge.

16. A continuous method of automatically separating the contents from the shells of eggs, comprising the positioning of an egg with its long axis substantially vertical, severing a segment from the top of the egg shell, automatically moving the egg to tilt the long axis while the remaining segment of the shell is held, and thereafter releasing the empty shell.

17. A continuous method of automatically separating the contents from the shells of eggs comprising the positioning of an egg with its long axis substantially vertical, severing a minor section from the upper end of the shell, automatically moving the egg to tilt the long axis while the major segment is gripped, and thereafter automatically releasing the empty shell.

18. A continuous method of automatically separating the contents from the shells of eggs, comprising the formation of a lateral aperture or apertures in the egg shell and the applying of force such as centrifugal force to exude one element of the contents laterally through the aperture or apertures.

19. A continuous method of automatically separating the contents from the shells of eggs, comprising moving eggs so that each in succession is held in a position with its major axis substantially vertical, the formation of a lateral aperture or apertures in the egg shell while confined to such vertical position and the applying of centrifugal force to exude one element of the contents laterally through the aperture or apertures.

20. A method of automatically separating the contents from the shells of eggs, comprising the formation of an aperture in the shell while supporting each egg in a position with its major axis substantially vertical, applying radial force substantially in the equatorial plane of the egg to exude the albumen, thereafter opening the shell and removing the balance of the contents therefrom.

21. A continuous method of automatically separating and collecting egg values which consists in exuding the albumen through lateral apertures in the egg shell by rotating same on its major axis and then decapitating the shell and spilling out the yolk from the decapitated shell.

22. A method of automatically separating the contents of eggs from the shell, comprising continuous steps of suitably holding the egg, forming an aperture in the shell, removing by force radial to the egg at least a portion of the contents through the aperture.

23. A method of separating egg contents from the shell comprising the positioning and supporting of each egg on end, the forming of an aperture in the shell at or above the middle and expelling at least a portion of the contents therethrough by subjecting the egg to centrifugal force.

24. The method of separating the contents of eggs from their shell, comprising the forming of an aperture in the shell, subjecting the egg to high rotative speed, and exuding the albumen through the apertures and thereafter opening the shell.

25. A method of separating the contents of eggs from the shell, comprising the forming of an aperture in the equatorial zone of the shell, spinning the egg about an axis substantially coincident with the long axis of the egg and expelling at least a portion of the contents through the aperture.

26. A method of separating the contents of an egg from its shell comprising the aperturing without breaking of the shell, automatically applying force to remove the albumen contents through the apertures, thereafter separating the shell into two parts, and discharging the yolk.

27. A method of separating the contents of an egg from its shell, comprising the aperturing of the shell, forcibly removing the albumen through the aperture, gripping the shell and thereafter decapitating the shell, inverting the open shell to discharge the yolk and then discharging the shell from its gripped position.

28. A method of automatically separating the contents from the shell of eggs comprising continuous machine synchronized operations including the successive positioning of each egg in a vertical position, cutting off and removing an upper section of the shell, and thereafter discharging the contents from the lower section of the shell.

29. A method of automatically separating the contents from the shell of eggs, comprising synchronized mechanical operations including progressively first gripping each egg and holding it in a substantially vertical position, sawing off an upper segment of each shell, and thereafter discharging the contents from the lower segment of the shell remaining in gripped position.

30. A method of automatically separating the contents of eggs from their shells, comprising continuous mechanical operations of positioning each egg with its long axis substantially vertical, moving each egg into engagement with a decapitating device and thereby removing a minor segment from the top of each shell and thereafter discharging the contents.

31. A method of separating the contents from the shell of eggs comprising the automatic positioning of each egg with its long axis substantially vertical, thereafter engaging the egg with shell aperturing devices and without breaking the shell into separate parts, aperturing the shell in a plurality of separated places largely in its equatorial zone and leaving the integral lower section of the shell below the apertures.

32. A method of separating the contents of an egg from its shell comprising the automatic mechanical movement of an egg in a substantially vertical direction and maintaining the egg with its long axis substantially vertical, bringing the egg so positioned into the path of the rotary saw, and slotting the side of the shell on a meridian line without separating the shell into parts, and therewith leaving a lower segment of the shell integral below the slot.

33. A method of separating the contents of eggs from their shells, which consists in positioning the egg with its long axis substantially upright, bringing the egg into the path of a rotating saw, decapitating the upper end of the shell, inverting the latter to discharge its contents, and discarding the shell at a point remote from the point of discharge of the contents.

34. A method of separating the contents of eggs from their shells, comprising the moving of a series of eggs through the path of a rotating saw, decapitating the upper end of each shell, passing the decapitated shells progressively into an inverted position suitable for the discharge of their contents, and discharging each shell progressively at a point remote from the point of discharge of the contents.

In testimony whereof I have signed my name to this specification.

HARRY E. HARKIN.